(12) United States Patent
Huang et al.

(10) Patent No.: US 6,466,281 B1
(45) Date of Patent: Oct. 15, 2002

(54) INTEGRATED BLACK MATRIX/COLOR FILTER STRUCTURE FOR TFT-LCD

(75) Inventors: Tinghui Huang, Hsinchu (TW); Jr-Hong Chen, Hsinchu (TW); Biing Der Liu, Taipei (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 09/378,965

(22) Filed: Aug. 23, 1999

(51) Int. Cl.$^7$ .................. G02F 1/136; G02F 1/1335
(52) U.S. Cl. ........................... 349/44; 349/106
(58) Field of Search ................ 349/42, 114, 143, 349/44, 111, 110

(56) References Cited

U.S. PATENT DOCUMENTS

| | | | |
|---|---|---|---|
| 5,258,608 A | * 11/1993 | Uchiva | 250/208 |
| 5,708,485 A | * 1/1998 | Sato et al. | 349/42 |
| 5,818,550 A | * 10/1998 | Kadota et al. | 349/43 |
| 5,870,158 A | * 2/1999 | Abe et al. | 349/111 |
| 6,078,368 A | * 6/2000 | Ichikawa et al. | 349/48 |

\* cited by examiner

*Primary Examiner*—Toan Ton
(74) *Attorney, Agent, or Firm*—Nath & Associates PLLC; Harold L. Novick

(57) ABSTRACT

An active cell for a thin-film transistor liquid crystal display, with integrated black matrix/color filter, includes a switching device, a data line, a scanning line, a planarization layer, a light shielding layer, a dielectric layer, a first electrode layer, a liquid crystal layer, a second electrode layer, and a counter plate. The switching device is formed on the substrate, wherein the data line supplies data signals to the switching device and the scanning line supplies controlling signals to the switching device. The planarization layer is formed on the switching device and has a contact opening which is extended down to a driven end of the switching device. The light shielding layer is on a portion of the planarization layer and the dielectric layer is on the light shielding layer and a top planar region of the planarization layer. The first electrode layer is formed on the dielectric layer and the planarization layer, and the first electrode layer also communicates to the driven end of the switching device through the contact opening. The liquid crystal layer is on the substrate, the second electrode layer is on the liquid crystal layer, and the counter plate on the second electrode layer.

17 Claims, 2 Drawing Sheets

INTEGRATED BLACK MATRIX/COLOR FILTER STRUCTURE FOR TFT-LCD

BACKGROUND OF THE INVENTION

1. Field of the Invention

The present invention relates to display devices, and more particularly, to an integrated black matrix or color filter structure for thin-film transistor (TFT) liquid crystal display (LCD).

2. Description of the Prior Art

The technology of liquid crystal display (LCD)has been continuously developed for several decades to enhance the image displaying quality of various kind of displaying systems. In comparing with conventional cathode radiation tube (CRT) systems, the liquid display system has the advantages such as reduced volume, light weight, low power consumption, and high resolution. Having the application of thin film transistors (TFT) in driving the display cells of the liquid crystal display and accompanying fabrication processes, the size of the display system is further scaled down with the integrated structure design and improved packing density of the semiconductor fabrication technology. The thin film transistor liquid crystal display have been employed in various kind of computer, communication, and consumer electric products such as desktop and notebook computers, personal digital assistant (PDA) devices, mobile communicators and web site browsers, and liquid crystal projectors.

In the design of thin film transistor liquid crystal display, since the thin film transistors and liquid crystal display regions are formed around each other between two light-transparent plates to make the image visible, the circuit and transistor regions which are mostly consisted of non-transparent materials must be shield from being visible, in order the make the image information be displayed with clarity and minimum disturbances from the pattern of non-transparent regions.

FIG. 1 illustrates schematic cross-sectional view of a prior art liquid crystal display device employing thin film transistors. A plurality of thin-film transistors 12 are formed on the bottom plate 10, and the thin-film transistors 12 are provided with source regions S and drain regions D. Pixel element electrodes 14a is formed on the bottom plate 10 to connected with the drain regions D. A common electrode 14b is provided in opposite to the pixel element electrodes 14a with a liquid crystal material 16 therebetween to form a vertical driving display device.

For shielding circuitry and less active display regions, and allow the back light to pass through main display cell regions, a shielding layer, or namely a black matrix or a dark matrix, is provided with a designed pattern corresponding to the regions such as transistors in the figure. In the application of color liquid crystal display device, color filters like red (R), green (G), and blue (B) filters are utilized and placed between the regions of black matrix to create image information in color. Polarizing plates 10a and 20a can also be added respectively outside the bottom plate 10 and a top plate 20.

In the typical design and accompanying fabrication processes of the aforementioned liquid display device, the black matrix 18, the color filters R, G and B, and the common electrode 14b are formed on the top plate 20. The top plate 20 with the layers and patterns formed and the bottom plate 10 with circuitry and transistors are then bonded together with a space provided therebetween for receiving the liquid crystal material 16.

However, having the decreasing scale of liquid crystal display cells in the present stage technology, the size of each display cell can be as small as 23 micrometers×69 micrometers, or even smaller, which makes the bonding process for the top plate 20 the bottom plate 10 hard to control. The process window for the fabrication process is too small to be followed with high accuracy, the minor shift in aligning the two plates 10 and 20 may lead to the reduction of aperture ratio, which is an index for measuring the relative area of visible transparent regions to the total area, as high as 30% and greatly damage the displaying characteristic and capability of the liquid display device.

Several approaches have been proposed for solving the aforementioned issues. One approach is to extend the region of black matrix 18, like the additional region dX indicated in FIG. 1, thereby providing a increased process window for aligning and bonding the two plates 10 and 20. However, the approach does not solve the problem of decreased aperture ratio, and even make it worse, since the visible area is further reduced by extending the black matrix pattern. Another approach is to form the black matrix pattern directly on the bottom plate, at somewhere between the thin film transistors 12 and the bottom plates. However, the method is only workable for backside illuminated display device and can not be employed for direct viewing display device, under the lack of light shield when being observed from the top side of the display device.

In the design of thin film transistor liquid display device, the capacitive coupling effect of each display cell is important for maintaining the display status, namely the orientation of the liquid crystal molecules. The capacitive coupling effect and the display status of each display cell must be maintained without observable degradation between each scanning cycle, and also for avoiding the influence of undesired leakage and coupling noises. However, having the down-scaling in the size of the display units, the capacitive coupling effect is further limited under limited area. The fabrication of the densely packed display device can be limited without the improvement in providing raised capacitive coupling effect of unit cell in the limited area.

SUMMARY OF THE INVENTION

In accordance with the present invention, an active cell for a thin-film transistor liquid crystal display, with integrated black matrix/color filter, is provided. The active cell on a substrate includes a switching device, a data line, a scanning line, a planarization layer, a light shielding layer, a dielectric layer, a first electrode layer, a liquid crystal layer, a second electrode layer, and a counter plate. The switching device is formed on the substrate, wherein the data line supplies data signals to the switching device and the scanning line supplies controlling signals to the switching device. The planarization layer is formed on the switching device and has a contact opening which is extended down to a driven end of the switching device. The light shielding layer is on a portion of the planarization layer and the dielectric layer is on the light shielding layer and a top planar region of the planarization layer. The first electrode layer is formed on the dielectric layer and the planarization layer, and the first electrode layer also communicates to the driven end of the switching device through the contact opening. The liquid crystal layer is on the substrate, the second electrode layer is on the liquid crystal layer, and the counter plate on the second electrode layer.

In the preferred embodiments, the active cell further includes a bias generator which is electrically coupled between the light shielding layer of a conductive material and the second electrode layer, in order to provide a bias voltage between the light shielding layer and the second electrode layer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
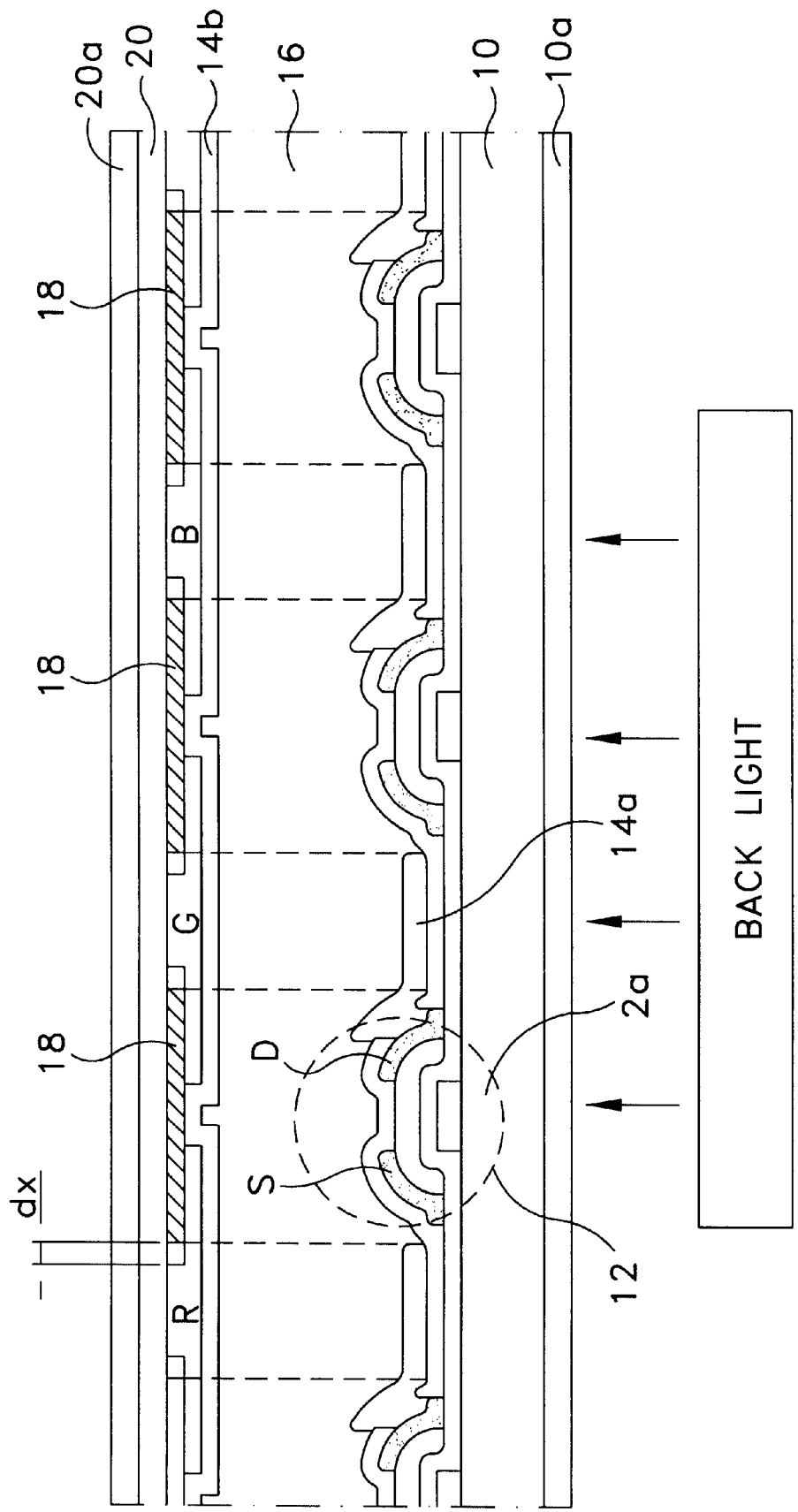
FIG. 1 illustrates a partial cross-sectional view of a prior art thin film transistor liquid crystal display structure between two substrates.
Figure 2:
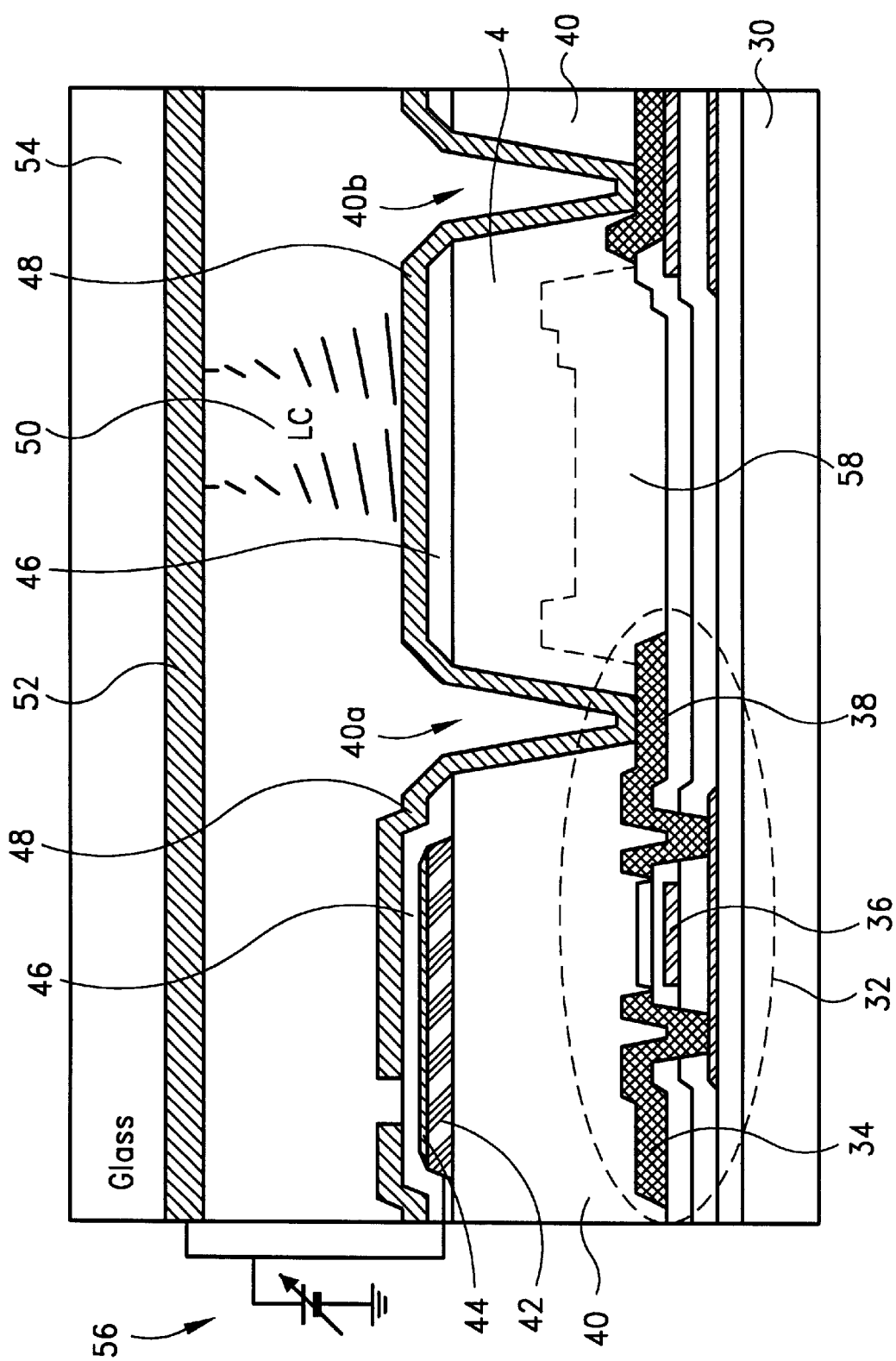
FIG. 2 illustrates a partial cross-sectional view of a unit cell structure of a thin film transistor liquid crystal in accordance with the present invention.

Referring to FIG. 2, a partial cross-sectional view of a thin-film transistor liquid crystal display is illustrated. In order to have a clear and focused illustration of the present invention, only one active cell, or namely one active liquid crystal display cell is depicted in detail in the figure. It is well known in the art that a plurality of display cells are typically formed on a liquid display device for displaying image information consisting of a great number of pixels.

The active cell is formed on a substrate 30, which is preferably a transparent glass substrate in the case. The active cell of the present invention mainly includes a switching device 32, a data line 34, a scanning line 36, a planarization layer 40, a light shielding layer 42, a dielectric layer 46, a first electrode layer 48, a liquid crystal layer 50, a second electrode layer 52, and a counter plate 54.

The switching device 32 is located on the substrate 30 to act as the major device for controlling the display status of each image display pixel. For controlling the displayed status, the data line 34 supplies data signals to the switching device 32 and the scanning line supplies controlling signals to the switching device 32. In the preferred embodiments, the switching device 32 is a transistor, or more specifically, a thin-film transistor. In the most preferred applications, the scanning line 36 is connected to the gate of the transistor, the data line 34 is connected to a source region of the transistor, thus a driven end 38 can be connected to a drain region of the transistor and is thereby being driven by the operation of the transistor through the signal of the scanning line 36.

The planarization layer 40 is provided to cover on the switching device 32 and other regions of the substrate 30, in order to provide a planar topography for forming other structures thereon. The planarization layer 40 has a contact opening 40a therein, which is extended down to the driven end 38 of the switching device 32, for providing a electrical coupling between the first electrode layer 48 and the driven end 38. Another contact opening 40b is also illustrated in FIG. 2 for connecting the first electrode layer 48 to another gate line of the transistor next to the transistor 32. In the case, the planarization layer 40 is an organic layer and materials having a low dielectric constant such as Benzocyclo butene Acrylic and Methaaylute desiutis can be utilized for planarization.

The light shielding layer 42, or namely the black matrix layer, is located on a portion of the planarization layer 40, and is preferably located over the switching device 32, the data line 34 and the scanning line 36, thereby shielding the light from passing or reaching the circuitry and transistor regions on the transparent substrate 30. In the preferred embodiments, the light shielding layer 42 is a conductive material, metals such as chromium, molybdenum, titanium, copper-aluminum, aluminum, and the like can be utilized as a good light shield in the case.

In the application of employing a metal layer as the light shielding layer 42, an anti-reflection layer 44 is preferably inserted between the light shielding layer 44 and the dielectric layer lying over it. The light shielding layer 44 absorbs the incoming light from the top side of the display panel and prevent the undesired reflection from the light shielding layer 42 to provide a better image quality. A metal oxide layer can be utilized in the case. As an example, if chromium is applied as the light shielding layer 42, a thin layer of chromium oxide is preferably applied as the anti-reflection layer 44 in the case.

The dielectric layer 46 is placed on the light shielding layer 44, or on the anti-reflection layer 44 if it is applied, and also a top planar region of the planarization layer 40, thereby providing an insulation between the overlying first electrode layer 48 and the light shielding layer 44. With the structure design of the present invention, an additional capacitor can be provided by the tri-layer structure of first electrode layer 48, the dielectric layer 46, and the light shielding layer 44. Therefore, a dielectric material such as silicon oxide, silicon nitride, silicon oxynitride, and a stacked structure of silicon oxide-silicon nitride-silicon oxide (ONO) can be utilized. Other dielectric materials having high dielectric constant can also be applied alternatively.

The first electrode layer 48 is on the dielectric layer 46 and the planarization layer 40. For being driven through the operation of the switching device 32, the conductive electrode 48 communicates to the driven end 38 of the switching device 32 through the contact opening 40a, and the conductive electrode 48 can also communicate to another gate line through the contact opening 40b. In the application of the thin film transistor liquid crystal display, the first electrode layer 48 is a transparent and conductive material, and an indium-tin-oxide (ITO) electrode layer and the like are typically employed.

The liquid crystal layer 50 is located on the substrate 30, or namely is inserted and received between the substrate 30 and the overlying counter plate 54. Between the substrate 30 and the overlying counter plate 54, the second electrode layer 52 is placed on the liquid crystal layer 50 to serve as a common electrode for displaying units. In the application of the thin film transistor liquid crystal display, the second electrode layer 52 is a transparent and conductive material, and an indium-tin-oxide (ITO) electrode layer and the like are typically employed.

Besides the aforementioned structure, the active cell of the present invention can further include a bias generator 56 electrically coupled between the light shielding layer 42, which is made of a conductive material in the case, and the second electrode layer 52. In the preferred embodiments, the bias generator 56 is a DC power supply for providing a bias voltage between the light shielding layer 42 and the second electrode layer 52. As an example, for a liquid crystal display cell having a scanning line voltage between about −20 to +35 volts and a data line voltage between about −6 to +6 volts, the bias voltage between the light shielding layer 42 and the second electrode layer 52 is between about −5 to +5 volts, wherein the second electrode layer 52 has a higher voltage than the light shielding layer 42 in the case.

By the employment of the bias generator 56, the light shielding layer 42, or namely the black matrix pattern, can be applied with a predetermined voltage in relative to the second electrode layer 52, thereby eliminating the undesired coupling effect under the operating status of the first electrode layer 48. Moreover, since the light shielding layer 42 is coupled with a prescribed voltage, a capacitive coupling can be generated between the light shielding layer 42 and the overlying first electrode layer 48. Therefore, in addition to a conventional storage capacitor on the common electrode (Cs on common), a storage capacitor on the gate (Cs on gate) is also provided. Having the thin dielectric of the dielectric layer 46 of about 500 to 4000 angstroms inserted therebetween, the capacitance of this additional capacitor can be greatly raised.

Therefore, the total capacitance of each display cell can be significantly increased, or preferably doubled or more than doubled with the proposed structure. Besides, the breakdown or undesired coupling issue of prior art black matrix pattern can be reduced or eliminated. Having the greatly enhanced total coupling effect and capacitance of each cell, the proposed structure of the present invention can be employed in fabricating high resolution panel, especially a small size panel having a high resolution in which the unit cell area is limited and a raised capacitance is highly needed. The device performance and stability of the liquid crystal display is improved with the increased storage capacitance.

In the application of color liquid crystal display cells, a color filter 58 such as red, green, and blue filters can be added. Since the major displaying area is located in the region uncovered by light shielding layer 42, the color filter 58 can be placed under a portion of the planarization layer 40 at the displaying area, or namely the transparent region which is uncovered by the light shielding layer 42. By placing the color filter under the first electrode layer 48, the prior art problem of high data driving voltage and driving effect non-uniformity can be eliminated.

In the structure of the present invention, the light shielding layer 42 for defining the black matrix pattern and the color filter 58 are formed on the substrate 30, namely on the same side with the transistors and circuitry regions. Therefore, the prior art alignment problem between the bottom plate and the counter plate can be eliminated, and the aperture ratio of the display cell is thus increased. By employing a low dielectric constant (low-K) organic material as the planarization layer 40, the coupling effects is further reduced.

Although specific embodiments have been illustrated and described, it will be obvious to those skilled in the art that various modifications may be made without departing from the spirit which is intended to be limited solely by the appended claims.

What is claimed is:

1. An active cell for a thin-film transistor liquid crystal display on a substrate, said active cell comprising:
   a switching device on said substrate;
   a data line for supplying data signals to said switching device;
   a scanning line for supplying controlling signals to said switching device;
   a planarization layer on said switching device and said substrate, said planarization layer having a contact opening which is extended down to a driven end of said switching device;
   a light shielding layer on a portion of said planarization layer;
   a dielectric layer on said light shielding layer and a top planar region of said planarization layer;
   a first electrode layer on said dielectric layer and said planarization layer, said first electrode communicating to said driven end of said switching device through said contact opening;
   a liquid crystal layer on said substrate;
   a second electrode layer on said liquid crystal layer; and
   a counter plate on said second electrode layer.

2. The active cell according to claim 1, wherein said switching device comprises a transistor, said scanning line is connected to a gate of said transistor, said data line is connected to a source region of said transistor, and said driven end is connected to a drain region of said transistor.

3. The active cell according to claim 1, wherein said planarization layer comprises an organic layer.

4. The active cell according to claim 1, wherein said light shielding layer is located over said switching device, said data line and said scanning line.

5. The active cell according to claim 1, wherein said light shielding layer comprises a conductive material selected from the group consisting of chromium, molybdenum, titanium, copper-aluminum, and aluminum.

6. The active cell according to claim 1 further comprises an anti-reflectionlayer between said light shielding layer and said dielectric layer.

7. The active cell according to claim 1, wherein said first electrode layer comprises an indium-tin-oxide (ITO) electrode layer.

8. The active cell according to claim 1, wherein said second electrode layer comprises an indium-tin-oxide (ITO) electrode layer.

9. The active cell according to claim 1 further comprises a color filter lying under a portion of said planarization layer which is uncovered by said light shielding layer.

10. An active cell for a thin-film transistor liquid crystal display on a substrate, said active cell comprising:
    a switching device on said substrate;
    a data line for supplying data signals to said switching device;
    a scanning line for supplying controlling signals to said switching device;
    a planarization layer on said switching device and said substrate, said planarization layer having a contact opening which is extended down to a driven end of said switching device;
    a light shielding layer on a portion of said planarization layer;
    an anti-reflection layer on said light shielding layer,
    a dielectric layer on said anti-reflection layer and a top planar region of said planarization layer;
    a first electrode layer on said dielectric layer and said planarization layer, said first electrode communicating to said driven end of said switching device through said contact opening;
    a liquid crystal layer on said substrate;
    a second electrode layer on said liquid crystal layer;
    a counter plate on said second electrode layer; and
    a bias generator electrically coupled between said light shielding layer of a conductive material and said second electrode layer, in order to provide a bias voltage between said light shielding layer and said second electrode layer.

11. The active cell according to claim 10, wherein said switching device comprises a transistor, said scanning line is connected to a gate of said transistor, said data line is connected to a source region of said transistor, and said driven end is connected to a drain region of said transistor.

12. The active cell according to claim 10, wherein said planarization layer comprises an organic layer.

13. The active cell according to claim 10, wherein said light shielding layer is located over said switching device, said data line and said scanning line.

14. The active cell according to claim 10, wherein said light shielding layer comprises a conductive material selected from the group consisting of chromium, molybdenum, titanium, copper-aluminum, and aluminum.

15. The active cell according to claim 10, wherein said first electrode layer comprises an indium-tin-oxide (ITO) electrode layer.

16. The active cell according to claim 10, wherein said second electrode layer comprises an indium-tin-oxide (ITO) electrode layer.

17. The active cell according to claim 10 further comprises a color filter lying under a portion of said planarization layer which is uncovered by said light shielding layer.

* * * * *